United States Patent [19]

Harvey

[11] Patent Number: 5,040,907
[45] Date of Patent: Aug. 20, 1991

[54] BEARING SYSTEM WITH REDUNDANCY OF RACES

[75] Inventor: Thomas J. Harvey, Lompoc, Calif.

[73] Assignee: AEC-Able Engineering Co., Goleta, Calif.

[21] Appl. No.: 479,699

[22] Filed: Feb. 13, 1990

[51] Int. Cl.[5] .................. F16C 33/52; F16C 19/28; F16C 33/34
[52] U.S. Cl. .................................... 384/574; 384/450; 384/548; 384/565
[58] Field of Search ........ 384/450, 548, 549, 553–555, 384/565, 572, 574, 624, 627

[56] References Cited

U.S. PATENT DOCUMENTS

| | | | |
|---|---|---|---|
| 4,601,628 | 7/1986 | Lowing | 384/574 X |
| 4,629,340 | 12/1986 | Provost et al. | 384/450 X |
| 4,690,574 | 9/1987 | Green | 384/548 X |
| 4,761,084 | 8/1988 | Benton et al. | 384/619 |

Primary Examiner—Thomas R. Hannon
Attorney, Agent, or Firm—Donald D. Mon

[57] ABSTRACT

A bearing system providing redundancy of bearing function. An inner race and an outer race are concentric and axially spaced apart from one another. A bearing set includes a pin of individually rotatable bearing wheels. The wheels are mounted by an intermediate retainer. A selector is provided to restrain either of the races from rotation relative to its respective wheel, thereby providing for selection of which race is to be active in providing relative rotation of the races.

8 Claims, 3 Drawing Sheets

BEARING SYSTEM WITH REDUNDANCY OF RACES

FIELD OF THE INVENTION

This invention relates to rotary bearing systems which involve coaxial rotation of two elements, and in particular to such systems which provide a plurality of bearing sets so that relative rotation of the elements can continue even though one of the sets is disabled.

BACKGROUND OF THE INVENTION

To enable coaxial relative rotation of a pair of elements it is established practice to provide a race body on one element and a bearing body on the other element. The two bodies provide a bearing structure that enables relative rotation to occur between the two elements. The bearing bodies have matching continuous ring-shaped race surfaces to make a friction bearing, or instead have rollers or balls between them to form roller or ball bearings. In any event, damage to either body, and especially to a race, destroys the bearing function, and the system must be repaired, usually by replacing the damaged race.

This may not be much of a problem in conventional machinery in convenient locations. In a factory, a large bearing can be dismantled, the damaged parts removed and replaced, and the bearing reassembled. There is no particular difficulty in what is basically only a time-consuming inconvenience. However, there are installations wherein such a solution is not acceptable. One example is found in relatively large space-based installations. In such locations the physical effort required to repair a structure in this way is often simply not available, and storage of spare parts is not practicable. The need to wait for replacement parts to be sent aloft, or the need for an astronaut to make substantial exertions to repair the structure can cripple a project.

It is necessary to anticipate that serious damage may be done to bearing systems, for example as the consequence of collisions with space junk. Unless the system is inherently provided with means to restore the bearing function without requiring the use of spare or replacement parts, and/or unless it can be repaired with only minimal physical effort, that system is seriously flawed for such applications.

A well-received system which provides for redundancy of bearing sets, so that in the event one bearing set is disabled, another set can be utilized with minimal physical effort and no replacement parts is shown in Benton U.S. Pat. No. 4,761,084, issued Aug. 2, 1988. This patent is incorporated herein in its entirety by reference for its showing of such a system and its desirability. The instant invention is regarded by its inventor as an improvement to the Benton system.

Although the instant system can be utilized in any bearing system in which a ready response is required in the event of failure of a bearing set, its primary utility will be found in applications wherein substantial delay in response is objectionable, and in which access to the failed system is difficult, and in which it is undesirable to have spares at hand for replacement of failed parts. Examples of such installations are battlefield and spacecraft antennas, and space devices such as telescopes, antennas, and direction-sensitive experiments, controls and panels.

However, in all of these, there may be an ultimate need for repair, and for this purpose it is an object of this invention to provide for ready removal and replacement of the rolling bearing portion of the bearing sets, as well as for redundancy of bearing function after failure of one of the races.

While it is acceptable in many installations for two bearing sets to roll simultaneously and in series with one another, there are other installations where for some reason it may be preferred for only one set to run at a time, and to provide readily controlled selector means to select which one. It is an object of this invention to provide means for this purpose. This not only enables the selection of bearing set to be run, but provides for the full disablement of a damaged bearing set, all by remote command.

Bearing systems of the type contemplated by this invention will ordinarily be expected to operate in a wide range of temperatures. Such circumstances often result in binding in conventional bearing systems. The construction of bearing systems according to this invention is susceptible to design wherein its net coefficient of thermal expansion is sensibly near zero, and this is another object of the invention.

BRIEF DESCRIPTION OF THE INVENTION

A bearing system according to this invention has a central axis of relative rotation and comprises an outer structural element which incorporates an outer race element. The outer race element has an outer race bearing surface which is annular and faces inwardly toward the central axis. An inner structural element has an inner race element. The inner race element has an inner race bearing surface, which is annular and faces outwardly, away from the central axis. The race elements are concentric around the central axis. The diameter of the outer race bearing surface is larger than the diameter of the inner race bearing surface to accommodate the rollers of the bearing sets.

An intermediate retainer element supports a plurality of bearing roller sets between the bearing surfaces. Each roller set comprises a plurality of bearing rollers, and an axle mounted to the retainer element supporting its respective bearing rollers for rolling contact with respective bearing surfaces. The bearing sets are angularly spaced apart from one another around the central axis.

Latch means is mounted to the retainer element, adapted selectively to engage either one of said race elements, or neither, whereby selectively to permit free and unimpeded rolling movement between said bearing rollers and both of said race elements, or to permit rolling movement only between said bearing rollers and one of the race elements.

According to a preferred but optional feature of this invention a peripheral guide rail is provided on one of said race bearing surfaces or bearing rollers, and a matching groove extends around the other to provide axial support for the bearing elements.

According to yet another preferred but optional feature of the invention, the retainer element comprises a pair of connected annular members, each supporting a respective end of each of the axles.

According to yet another preferred but optional feature of the invention, the guide rails are notched to permit axial removal of the bearing roller sets.

The above and other features of this invention will be fully understood from the following detailed description and the accompanying drawings, in which:

DETAILED DESCRIPTION OF THE INVENTION

Figure 1:
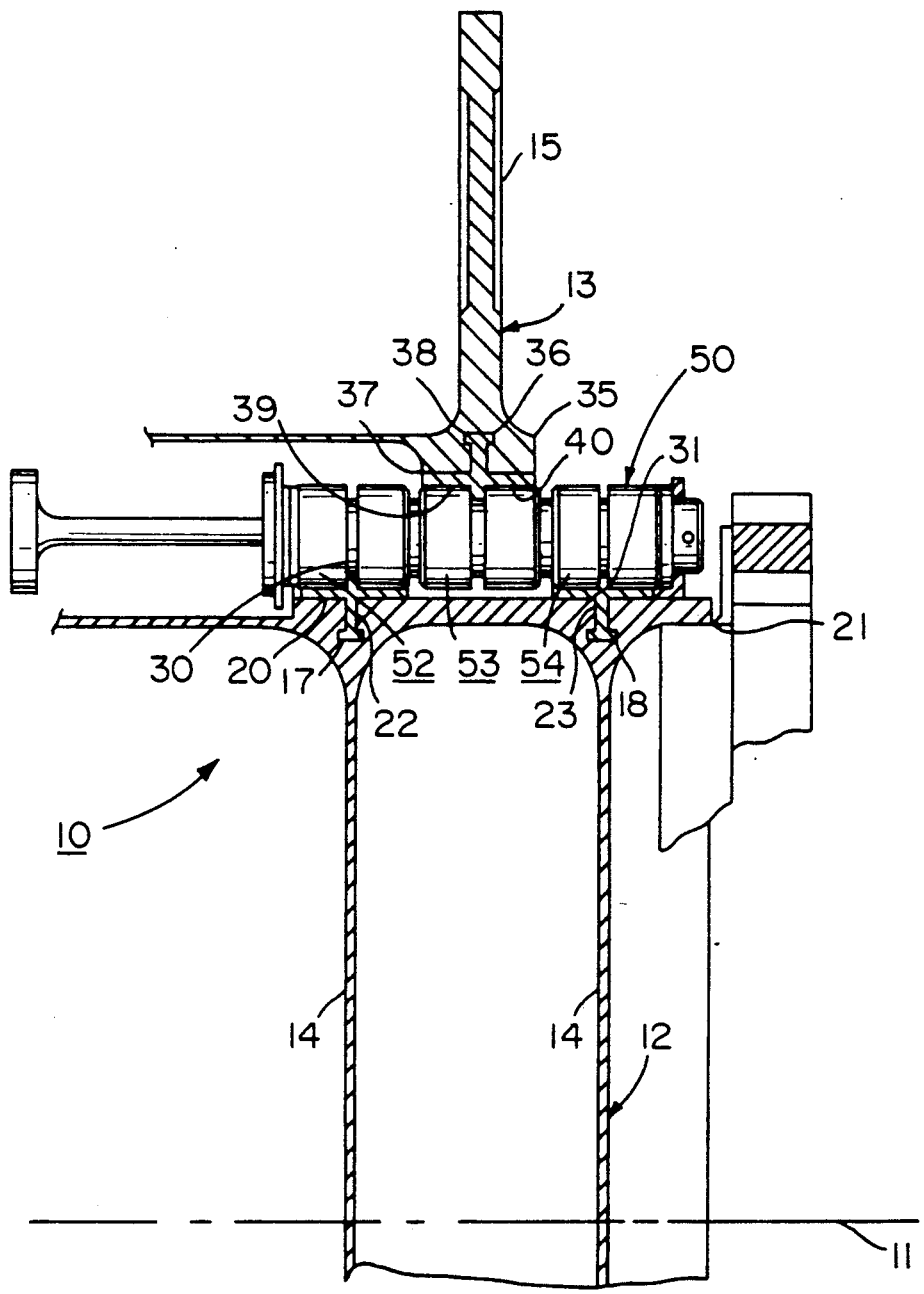
FIG. 1 is a half-view of an axial section through the invention.
Figure 2:
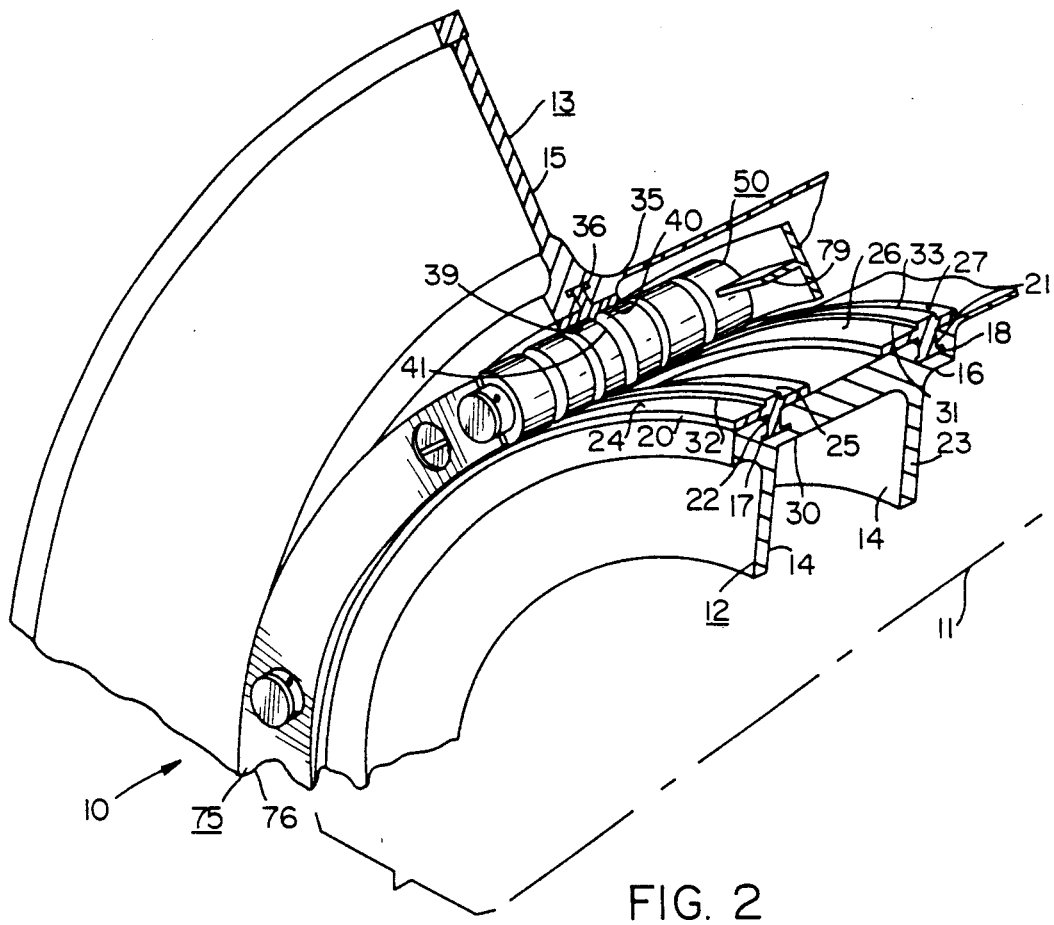
FIG. 2 is a perspective view of the invention, partly in cutaway cross-section.

The bearing system 10 according to this invention has a central axis 11. Its function is to provide for relative rotation of an inner structural element 12 and an outer structural element 13. The invention is not limited by the types of assemblies or devices which are mounted to it. Conveniently, flange 14 can be provided in element 12, and a flange 15 on element 13, to which next assemblies can be attached.

Inner structural element 12 includes a ring-like base 16 with a pair of T-slots 17, 18 extending around the axis. Inner race members 20, 21 have tongues 22, 23 inserted and held in the respective T-slots. Inner race member 20 has inner race bearing surfaces 24, 25. Race member 21 has inner race bearing surfaces 26, 27. These bearing surfaces are conveniently formed as cylinders, although they could be configured differently if preferred, but would still be surfaces of revolution.

A guide rail 30 is raised between surfaces 24 and 25. A guide rail 31 is raised between surfaces 26 and 27. For a purpose later to be described, notches 32, 33 are formed in rails 30, 31 respectively. They are axially aligned with one another.

Outer structural element 13 has a ring-like base 35 with a T-slot 36 extending around the axis. An outer race member 37 has a tongue 38 inserted and held in T-slot 36. Outer race member 37 has outer race bearing surfaces 39, 40. Bearing surfaces 39 and 40 are conveniently cylindrical, although they could be sectioned differently if preferred, but would still be surfaces of revolution.

A guide rail 41 is raised between surfaces 39 and 40. Again for a purpose later to be described, a notch (not shown) similar to notches 32 and 33 is formed in rail 41.

At this point it is essential to recognize that inner race members 20 and 21 are axially spaced apart from one another, and that outer race member 37 is aligned between them. In theory, only one inner and one outer race member are needed for this system, but best balance of forces is attained when one structural element has one more race member than the other. It is also possible to have two race members on the outer structural element and one on the inner element, as will later be appreciated.

Figure 4:
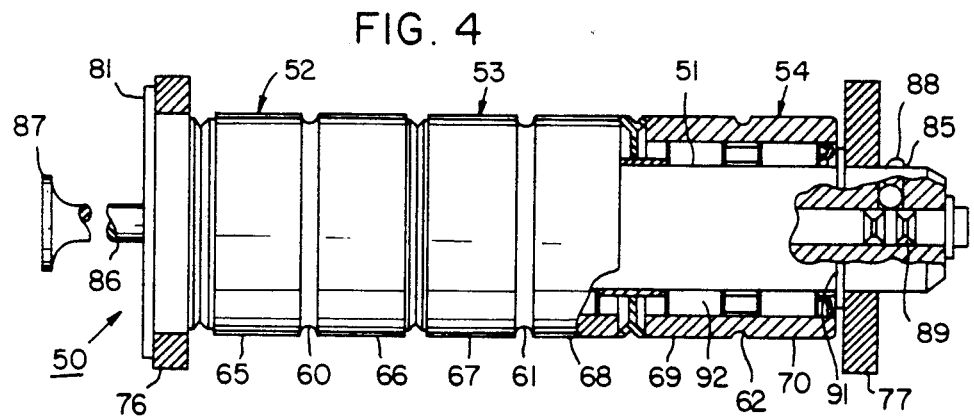
FIG. 4 is an enlarged view of a roller bearing used with the retainer of FIG. 3.

A plurality of roller assemblies typified by assembly 50 (FIG. 4) are placed between the inner and outer race members to roll along their race bearing surfaces. Only assembly 50 will be described in detail. The number of these assemblies actually provided will be determined by the size and other parameters of the system. For stability, at least three will generally be provided, and often many more will be provided.

Each assembly includes an axle 51 and three bearing wheels 52, 53, 54. Bearing wheels 52, 53 and 54 are respective to, and are adapted to roll along inner bearing race surfaces 24, 25, outer bearing race surfaces 39, 40, and inner bearing race surfaces 26, 27. These bearing wheels roll only on these surfaces, and not also on an opposite surface. For example, and much to the point, wheels 52 and 54 roll only on the inner bearing race surfaces and not on the outer bearing race surface. Roller wheel 53 rolls only on the outer bearing race surface, and not on the inner bearing race surfaces.

Wheels 52, 53 and 54 rotate freely on the axle, and rotate freely relative to one another. They may be supported on the axle by a friction bearing, or by ball, needle or roller bearings as preferred. The axle is not intended to rotate, although it could if desired.

Guide grooves 60, 61, 62 are peripherally formed in bearing wheels 52, 53, 54 respectively. They are aligned with guide rails 30, 41 and 31, respectively, so as to receive the rails and give side (axial) support. The primary bearing load is intended to be taken by contact of surfaces 65, 66, 67, 68, 69, 70 on the respective bearing race surfaces. Accordingly, the groove will generally be deeper than the rails are tall. Their width will be somewhat wider than the rails, but will still be fairly close. The principal axial support between the structural elements is derived from the side reactions of the rails in the grooves.

A retainer element 75 (FIG. 3) comprises a pair of disc-like rings 76, 77 one at each edge of the assembly. The axles are received and held in the rings, and the rings can move rotatably around the central axis as the wheels roll along the bearing surfaces.

The notches provide ready removal and replacement of the bearing assemblies. The notches are lined up relative to a bearing assembly to be removed or replaced, and the assembly can be pulled out.

The illustrated embodiment in its anticipated best usages is likely to be subjected to wide ranges of temperatures. Such wide ranges often raise difficulties of binding or slop in the bearing systems. It is an advantage of this invention that it can be made of materials whose thermal coefficients of expansion tend to cancel each other out. For example, the race elements can conveniently be made of titanium alloys, and the roller wheels and axles from steel. The primary structural elements are made of low or negative coefficient of thermal expansion materials, for example carbon-epoxy composites. Suitable selection of materials can greatly improve the performance of large-diameter, preloaded, or tight tolerance bearings over a substantial range of temperatures.

It will be observed at this point that unless the axles are restrained relative to one or the other of the race members, the structural elements can freely rotate, and the retainer elements can freely rotate, and the retainer elements will simply move to accommodate. Rolling will occur on both the inner and outer race bearing surfaces. Often this will be a permissible mode of operation.

However, it may be preferred that the roller wheels roll only on the inner or only on the outer race bearing surfaces. This might be a selection for any or no reason, but this availability of choice exemplifies the desirable redundancy in this system.

For example, if an inner race member is damaged, it will be desired to continue the relative rotation in the system, but on the outer race. This requires that movement of the axles relative to the inner race be stopped. In the event of damage to the outer race element, the movement of the axles relative to it must be stopped. Because the roller wheels on each axle are independent of each other, and will roll along only one such member the rolling is accommodated by the undamaged race member. Thus, this device has true bearing redundancy.

Figure 7:
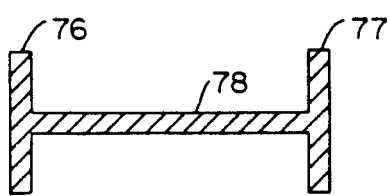
FIG. 7 is a cross-section taken at line 7—7 in FIG. 3.
Figure 3:
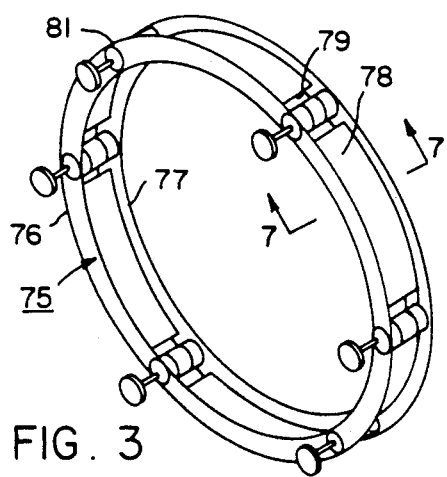
FIG. 3 is an enlarged view of a retainer element used in the invention.

Retainer element 75 is shown in greater detail in FIG. 3. Its rings 76, 77 are shown held together as part of an integral assembly with a web 78 (FIG. 7) that connects them. Apertures 79 in the web accommodate wheels 52–54.

Axle 51 has a shoulder 81 (FIG. 4) to bear against ring 76. At its other end it is provided with a ball detent lock 85. A lock shaft 86 is shiftable by gripping flange 87 to move it axially. In the illustrated position balls 88 are shoved outwardly so as to stand behind ring 77, thereby holding the axle in place. Shifting the lock shaft places a relief 89 beneath the balls and enables them to retract and permit the axle to be withdrawn. A snap ring 91 keeps the wheels on the shaft. Seals and thrust spacers are provided between the wheels as necessary. The wheels are mounted to the axle by bearings 92.

It will be seen that bearing assemblies can be removed and replaced merely by shifting the lock shaft and pulling it out. This requires alignment of the notches on the rails, of course, which is readily accomplished.

The assembly of this bearing system is straightforward. It is only necessary to assemble the rings and the wheel sets as described. One-by-one replacement of the wheel sets is straight-forward.

In the system as described thus far, both races, and the retainer ring, are freely rotatable to one another, and this is an available mode of operation. However, more frequently it will be desired to select one or the other of the races on which a roller or rollers is to operate, and to prevent rotation on the other race. This is accomplished by latching the retainer means to one or the other of the races to select the running race, or to neither race to enable both to run.

Figure 5:
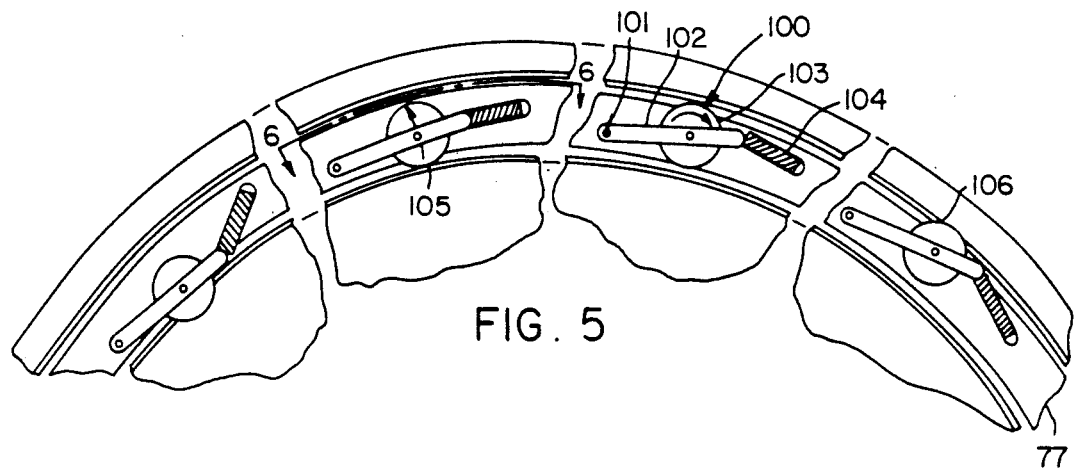
FIG. 5 is a fragmentary side view showing selector means according to the invention.
Figure 6:
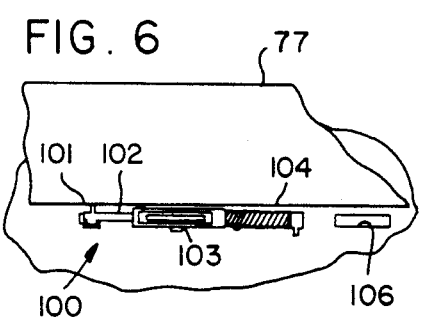
FIG. 6 is a cross-section taken at line 6—6 in FIG. 5.

FIG. 5 and 6 show a convenient form of latch means 100. There is ample space between the retainer rings and the bearing assemblies to receive and mount this means. There may be one or several of them as suitable to the system size. A pivot pin 101 mounted to one of the retainer rings pivotally mounts a lever 102. The lever supports a rotatable latch wheel 103, and extends to an over-center spring bias means 104 whose tendency is to move the lever in one direction or the other. It is a snap-over device, preferably a compression spring assembly. If desired, means can be provided to hold the lever in a centered position. The bias means tends to hold the lever in a selected off-axis position unless restrained in the middle position.

Detents 105 are formed in the inner race. Detents 106 are formed in the outer race. When the latch wheel is in a detent 105, it restrains the retainer ring and the wheels from running relative to the inner race, and all rolling action is on the outer race. When the latch wheel is in a detent 106, the retainer rings and wheels are restrained from running relative to the outer race, and all running action is on the inner race.

Thus by selecting the position of the latch means, selection of running bearing sets is possible, as well as full running of both sets. This is a compact roller system providing the user with redundancy of bearing function. The selection of lever position can be made manually or by any suitable actuator such as a pneumatic position or an electric solenoid.

The term "roller wheels" is frequently used herein to denote any kind of rotating bearing means for running on the races. Wheels, captive balls, needles, and the like are examples.

This invention is not to be limited by the embodiments shown in the drawings and described in the description, which are given by way of example and not of limitation, but only in accordance with the scope of the appended claims.

I claim:

1. A bearing system having a central axis of relative rotation, comprising:

an outer race element having an inwardly facing outer race;

an inner race element having an outwardly facing inner race, said races being concentric around said central axis;

an intermediate retainer element, a plurality of axles mounted to said retainer element and extending between said races and parallel to said central axis, and a plurality of independently rotatable roller wheels rotatably mounted to the axles, each roller wheel being in rolling contact with a respective one, but never with both races; and selectable latch means for restraining the retainer means and thereby the axles against relative movement relative to either of the races.

2. A bearing system according to claim 1 in which said inner and outer races are axially spaced apart, whereby roller wheels of equal diameter will contact only a race with which they are axially aligned.

3. A bearing system according to claim 1 in which a rail is formed on each race or roller wheel, and an axially aligned groove is formed in the other, whereby said rail and groove provide side support to hold each roller wheel in alignment with its respective race.

4. A bearing system according to claim 3 in which each rail has a notch which, when aligned with a respective axle, permits the roller wheels to be withdrawn.

5. A bearing system according to claim 4 in which said retainer element comprises a pair of rings, one disposed on each axial side of the races, said rings being held in assembled relationship by a structural web which extends between them.

6. A bearing system according to claim 5 in which each axle has a shoulder adapted to abut one of said rings, and retention means adapted releasably to abut the other of said rings to hold the axles and roller wheels in assembled relationship.

7. A bearing system according to claim 6 in which the ring adjacent to said shoulder is apertured sufficiently to permit said roller wheels to be withdrawn through it.

8. A bearing system according to claim 1 in which said inner and outer race element each comprises a structural element made of a low or negative coefficient of thermal expansion material, and a respective metallic race element mounted to it.

* * * * *